United States Patent [19]
Keryk et al.

[11] Patent Number: 4,911,986
[45] Date of Patent: Mar. 27, 1990

[54] CURABLE SILICONE COMPOSITIONS COMPRISING VINYL MONOMER

[75] Inventors: John R. Keryk, Mills Township, Gladwin County; Padmakumari J. Varaprath, Midland; Antony P. Wright, Mills Township, Gladwin County, all of Mich.

[73] Assignee: Dow Corning Corporation, Midland, Mich.

[21] Appl. No.: 12,475

[22] Filed: Feb. 9, 1987

[51] Int. Cl.[4] .................................................. B32B 9/04
[52] U.S. Cl. ...................................... 428/447; 522/99; 528/25; 528/32; 528/26; 526/260; 526/279; 427/35; 427/54.1; 428/452
[58] Field of Search ................... 526/260, 279; 528/32, 528/25, 26; 556/419, 424; 522/99; 427/35, 54.1; 428/447, 452

[56] References Cited

U.S. PATENT DOCUMENTS

| | | | |
|---|---|---|---|
| 4,070,526 | 1/1978 | Colguhoun et al. | 428/537 |
| 4,496,210 | 1/1985 | Ansel et al. | 350/96.3 |
| 4,608,270 | 8/1986 | Varaprath | 427/35 |

FOREIGN PATENT DOCUMENTS 52371 6/1981 Japan.

*Primary Examiner*—Melvyn I. Marquis
*Attorney, Agent, or Firm*—George A. Grindahl

[57] ABSTRACT

Curable organosilicon compounds which contain (meth)acryl-amido-substituted hydrocarbon radicals have their viscosities greatly reduced by the addition of a small amount of a vinyl monomer compound. Advantageously, the resulting compositions are more easily applied to a substrate, such as paper, in fast-paced coating operations without the significant loss of useful properties, such as the cure rate of the curable composition and the adhesive release behavior of the cured composition.

19 Claims, No Drawings

CURABLE SILICONE COMPOSITIONS COMPRISING VINYL MONOMER

BACKGROUND OF THE INVENTION

This invention relates generally to curable coating compositions comprising a polymerizable organosilicon compound and a polymerizable organic compound, and to a process for providing a substrate with a coating of a cured organosilicon compound. More specifically this invention relates to a coating process using novel, solventless silicone coating compositions which contain an organosilicon compound bearing (meth)acrylamide-substituted hydrocarbon radicals and certain organic vinyl compounds.

Colquhoun et al., U.S. Pat. No. 4,070,526, disclose radiation-curable coating compositions comprising a vinylic monomer, a mercaptoalkyl-containing siloxane compound and, optionally, a vinyl-containing siloxane compound. The vinylic monomer can be monofunctional or multifunctional and is said to be useful for varying the adhesive-releasing properties of the radiation-curable composition when it is coated onto a substrate and cured. However, the use of a vinylic monomer, whether monofunctional or multifunctional, with other types of silicone coating compositions, such as (meth)acrylamide-substituted organosilicon compounds, is not suggested.

Takamizawa et al., Japanese Publication No. 57-52371 (82-52371), disclose photosetting silicone compositions which contain a photosensitizer, certain (meth)acrylamide-containing siloxanes and, optionally, a solvent to reduce its viscosity. No examples of the solvent are disclosed and polymerizable diluents are not suggested.

Ansel et al., U.S. Pat. No. 4,496,210, disclose radiation-curable compositions for the coating of optical fibers. The compositions consist of certain ethylenically unsaturated siloxane compounds which have been narrowly defined so as to provide the cured composition with a certain modulus of elasticity. Specifically, the siloxane compound is limited to those containing a limited number of reactive side chains wherein the radiation-curable reactive sites thereof are monofunctional and have been derived from monofunctional side chains through the reaction of a radiation-curable compound therewith. Other materials, such as solvents, resins and radiation-curable monomers, can be incorporated into the composition. In particular, since patentees prefer ultraviolet light cure, liquid mono- or poly-acrylates may be added to adjust viscosity or for ancillary purpose. However, compositions comprising (meth)acrylamide-substituted organosilicon compounds are not suggested by this reference.

Varaprath, U.S. Pat. No. 4,608,270, discloses curable compositions which comprise di-(meth)acrylamide-substituted organosilicon compounds. These compositions are readily curable with heat or radiation and are said to be useful as comonomers with polymerizable vinyl monomers. Additionally, the curable compositions can also contain optional components which are commonly used in curable silicon-containing compositions. Examples of optional components are said to include solvents, polymerizable vinyl monomers, emulsion-forming components, colorants, stabilizers, fillers, adhesion promoters and surface modifiers. However, the use of specific organic vinyl compounds as polymerizable diluents is not suggested therein.

In view of the unusually high viscosity associated with organosiloxane polymers that contain di-(meth)acrylamide-substituted radicals it is desired to provide a way to reduce the viscosity of a coating composition prepared therefrom. Preferably, the coating composition should also not contain volatile materials that require additional equipment and/or processing steps for their containment and/or removal. Additionally, the composition should provide a coating that is not unfavorably altered by the particular means used to reduce the viscosity of the composition.

BRIEF SUMMARY OF THE INVENTION

It is an object of this invention to provide solventless, curable organosilicon compositions and a process for providing a cured coating on a substrate. More particularly, it is an object of this invention to provide solventless (meth)acrylamide-substituted silicone compositions which can be readily applied to a substrate and rapidly cured to adhesive-releasing coating on the substrate. It is a preferred object of this invention to provide solventless, curable compositions comprising a siloxane compound bearing di-(meth)acrylamide-substituted radicals and having a viscosity of less than 1000 centistokes at 25° C. These objects, and others which will become apparent to one skilled in the art of curable organosilicon compositions upon considering the following disclosure and appended claims are obtained by the present invention which, briefly stated, comprises mixing a vinyl monomer compound having a low viscosity with a curable silicone compound containing one or more (meth)acrylamide-substituted radicals. The vinyl monomer compound, even when used in minor amount, reduces the viscosity of the (meth)acrylamide-substituted compound and, in the case of adhesive-releasing organosiloxane compositions, maintains the cure and release characteristics of the silicone composition containing one or more (meth)acrylamide-substituted radicals.

DETAILED DESCRIPTION OF THE INVENTION

In a first aspect, this invention relates to a curable composition comprising (i) a (meth)acrylamidoorganosilicon compound containing at least one silicon-bonded, (meth)acrylamido-substituted hydrocarbon radical having the formula $-Q(NAQ')_aNAZ$ wherein a has a value of 0 or 1, Z denotes H or R, R denotes a monovalent hydrocarbon radical, Q and Q' denote divalent hydrocarbon radicals and A denotes a (meth)acrylyl radical having the formula $-C(O)CB=CH_2$ wherein B denotes hydrogen or methyl; any remaining silicon-bonded radicals in said (meth)acrylamidoorganosilicon compound being selected from the group consisting of organic radicals, divalent oxygen atoms linking silicon atoms hydrogen atoms and hydroxyl radicals.

(ii) from 0.1 to 60 percent by weight, based on the weight of (i) plus (ii), of a vinyl monomer compound and, optionally, (iii) a polymerization-initiating amount of a polymerization initiator compound.

Herein terms having the root (meth)acryl, such as (meth)acrylamido and (meth)acrylyl, are terms of the and/or type; i.e. said terms refer to methacryl and/or acryl terms, such as methacrylamido and/or acrylamido.

The (meth)acrylamidoorganosilicon compound (i) in the compositions of this invention can have any structure provided that it contains at least one silicon atom having bonded thereto the characteristic (meth)acrylamido-substituted hydrocarbon radical, hereinafter delineated, and any other silicon bonds are satisfied by radicals selected from the group consisting of organic radicals, other than the (meth)acrylamido-substituted hydrocarbon radical noted above, hydroxyl radicals, hydrogen atoms and divalent oxygen atoms linking silicon atoms. Thus (meth)acrylamidoorganosilicon compounds include silanes, siloxanes, silcarbanes and silcarbanesiloxanes.

The characteristic silicon-bonded (meth)acrylamido-substituted hydrocarbon radical has the formula —Q(-NAQ')$_a$NAZ, wherein Q and Q' denote divalent hydrocarbon radicals, Z denotes a hydrogen atom or a monovalent hydrocarbon radical (R radical). a has a value of 0 or 1 and A denotes a (meth)acrylyl radical having the formula —C(O)CH=CH$_2$ or —C(O)C(CH$_3$)=CH$_2$.

Examples of said Q radicals and Q' radicals include, but are not limited to, alkylene radicals such as —CH$_2$CH$_2$—, —CH$_2$CH(CH$_3$)—, —CH$_2$CH$_2$—, —CH$_2$CH(CH$_3$)CH$_2$—, and —(CH$_2$)$_6$—; and arylene radicals such as —C$_6$H$_4$—, —CH$_2$C$_6$H$_4$— and —CH$_2$C$_6$H$_4$CH$_2$—. Q can be the same as or different from Q', as desired.

Examples of said hydrocarbon Z radicals (R radicals) include, but are not limited to, alkyl radicals such as methyl, ethyl, propyl, butyl, hexyl and octyl; cycloaliphatic radicals such as cyclohexyl; aryl radicals such as phenyl, benzyl, styryl and tolyl; and alkenyl radicals such as vinyl and allyl.

In a preferred embodiment of this invention the (meth)acrylamidoorganosilicon compound (i) is prepared from silicon-containing precursors that have been prepared from ethylene diamine and a suitable silicon compound and thus contain silicon-bonded diamine radicals of the formula —QNHCH$_2$CH$_2$NH$_2$. Thus, in the (meth)acrylamidoorganosilicon compound formula Z preferably denotes H, a preferably has a value of 1 and Q' preferably denotes —CH$_2$CH$_2$—.

Preferably Q is an alkylene radical having from 3 to 10 carbon atoms and there are at least 3 carbon atoms between the silicon atom and the nitrogen bonded to the Q radical. Examples of preferred Q radicals are —CH$_2$CH(CH$_3$)CH$_2$— and 13 CH$_2$CH$_2$CH$_2$—.

In the (meth)acrylamidoorganosilicon compound (i) A denotes a (meth)acrylyl radical having the formula —C(O)CB=CH$_2$ wherein B denotes H or CH$_3$, i.e., an acrylyl radical or a methacrylyl radical.

Examples of the characteristic (meth)acrylamido-substituted hydrocarbon radicals include, but are not limited to, HNCH$_2$CH$_2$NCH$_2$CH(CH$_3$)CH$_2$—,
  |                    |
CH$_2$=CHC=O  O=CCH=CH$_2$

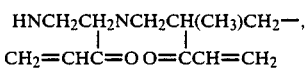

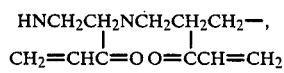

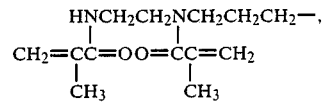

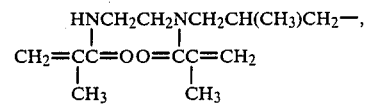

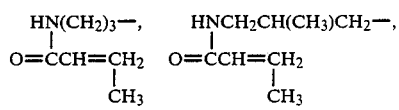

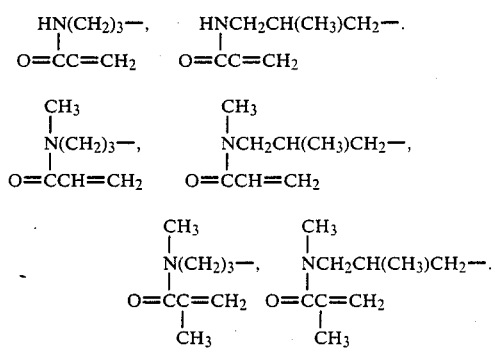

Silicon-bonded radicals that are permitted in the (meth)acrylamidoorganosilicon compound (i), in addition to the required (meth)acrylamido-substituted hydrocarbon radicals, include hydroxyl radicals, hydrogen atoms, organic radicals and divalent oxygen atoms linking silicon atoms.

Examples of said organic radicals include divalent hydrocarbon radicals linking silicon atoms, such as Q and Q' radicals noted above, and halogenated derivatives thereof; monovalent hydrocarbon radicals, such as R radicals noted above, and halogen derivatives thereof; (meth)acryloxy radicals and alkoxy radicals such as methoxy radicals. Preferably said organic radicals contain no more than 6 carbon atoms, such as methyl, 3,3,3-trifluoropropyl, phenyl and vinyl radicals. For most applications of the compositions of this invention the organic radicals are preferably methyl radicals.

The (meth)acrylamidoorganosilicon compound (i) typically has a silane or siloxane structure represented by the average unit formula R$_c${NAZ(Q''NA)$_a$Q}$_d$SiO$_{(4-c-d)/2}$ wherein R, A, Z, Q, Q'' and a have the general and preferred meanings noted above and c denotes a number having a value of from 0 to 3, such as 0, 0.5, 1.01, 2, 2.1 and 3, d denotes a number having a value of from >0 to 4, such as 0.01, 0.5, 1, 2 and 3, and c+d has a value of from 1 to 4 such as 1.5, 1.99, 2.01, 3 and 4. Of course, as noted above, the silane or siloxane must contain an average of at least one (meth)acrylamido-substituted hydrocarbon radical per molecule.

(Meth)Acrylamidoorganosilanes have the formula (R)$_c$Si{Q(NAQ'')$_a$NAZ}$_{4-c}$ wherein c denotes a number having a value of 0, 1, 2 or 3.

The compositions of this invention preferably contain (meth)acrylamidoorganosiloxanes which have the average unit formula R$_c${NAZ(Q''NA)$_a$Q}$_d$SiO$_{(4-c-d)/2}$ wherein c denotes a number having a value of from 0 to <3, such as 0, 0.5, 1.01, 2 and 2.5, d denotes a number having a value of from >0 to 3, such as 0.01, 0.5. 1, 2 and 3, and c+d has a value of from 1 to such as 1.5, 1.99, 2.01 and 3.

In addition to siloxane units which contain the required (meth)acrylamido-substituted hydrocarbon radical the (meth)acrylamidoorganosiloxanes can contain siloxane units which are free of (meth)acrylamido-substituted hydrocarbon radicals. These siloxane units have the general formula $R_eSiO_{(4-e)/2}$, wherein R is as denoted above and e has a value of 0, 1, 2 or 3; such as for example $MeSiO_{3/2}$, $Me_2SiO_{2/2}$, $MeViSiO_{2/2}$, $MePhSiO_{2/2}$, $Me_3SiO_{1/2}$, $Me_2(OA)SiO_{1/2}$, $ViMe_2SiO_{1/2}$ and $SiO_{4/2}$ units. The (meth)acrylamidoorganosilicon compound (i) can also contain siloxane units which bear hydrocarbon radicals which contain partial (meth)acrylamide substitution, such as $NAZQ''NHQSi(R_e)O_{(4-e)/2}$.

The siloxane units which contain the required (meth)acrylamido-substituted hydrocarbon radical have the formulae $R_eSiO_{(4-e)/2}$, noted immediately above, except that at least one of the R radicals is replaced with said (meth)acrylamido-substituted hydrocarbon radical.

Additionally, trace amounts of silicon-bonded residue radicals, such as hydroxyl radicals, alkoxy radicals and hydrogen atoms, may be found in these preferred siloxanes. Residue radicals typically arise from the particular synthesis method that was used to prepare the siloxane.

Preferred (meth)acrylamidoorganosiloxanes for use in the compositions of this invention have the formula $YR_2SiO(R_2SiO)_x(YRSiO)_ySiR_2Y$ wherein each Y independently denotes an R radical or a $-Q(NAQ')_aNAZ$ radical, delineated above, and x and y denote numbers having average values of from 0 to 5000 and 0 to 500, respectively; provided that the (meth)acrylamidoorganosiloxane contains at least two (meth)acrylamido-substituted hydrocarbon radicals.

Examples of preferred (meth)acrylamidoorganosiloxanes include, but are not limited to.

$Me_3SiO(Me_2SiO)_x(MeYSiO)_ySiMe_3$, $YMe_2SiO(Me_2SiO)_xSiMe_2Y$, $YMe_2SiO(Me_2SiO)_x(MeYSiO)_ySiMe_2Y$, $Me_3SiO(MeYSiO)_ySiMe_3$ and $YMe_2SiO(MeYSiO)_ySiMe_2Y$.

(Meth)Acrylamidoorganosiloxanes can also have a cyclic or branched structure such as $(YMe_2SiO)_4Si$ and $(YMeSiO)_4$, in addition to the linear structure noted above.

Herein the symbols Me, Ph and Vi denote methyl, phenyl and vinyl, respectively.

Curable compositions of this invention which are useful for coating a flexible substrate such as paper, polymer films and metal foils should comprise, as the (meth)acrylamidoorganosilicon compound (i), a siloxane having the formula $YR_2SiO(R_2SiO)_z(YRSiO)_gSiR_2Y$ wherein Y and R have the general and preferred meanings noted above, z has a value of from 10 to 2000, preferably 50 to 500, and g has a value of from 0 to 0.1 z, provided that there are an average of at least 2, preferably 3 to 10, (meth)acrylamido-substituted hydrocarbon radicals per molecule of the siloxane. When the curable composition is to be used as a coating composition this siloxane preferably has a viscosity of from 100 to 10,000, and most preferably 500 to 1,000 centistokes at 25° C.

Specific examples of (meth)acrylamidoorganosiloxanes to be used in curable coating compositions include $Me_3SiO(Me_2SiO)_{500}(MeYSiO)_5SiMe_3$, $Me_3SiO(Me_2SiO)_{50}(MeYSiO)_2SiMe_3$, $YMe_2SiO(Me_2SiO)_{2000}SiMe_2Y$, $YMe_2SiO(Me_2SiO)_{100}(MeYSiO)_3SiMe_2Y$, $HOMe_2SiO(Me_2SiO)_{1000}(MeYSiO)_4SiMe_2OH$, wherein Y denotes $-CH_2CH_2CH_2NACH_2CH_2NAH$ or $-CH_2CH(CH_3)CH_2NACH_2CH_2NAH$ and A is an acrylyl radical.

The (meth)acrylamidoorganosilicon compounds can be prepared by any suitable method. The disclosures of U.S. Pat. Nos. 2,929,829 and 4,608,270 are incorporated herein by reference to show how to prepare the numerous (meth)acrylamidoorganosilicon compounds that are suitable for use in the compositions of this invention.

(Meth)Acrylamidoorganosilicon compounds bearing di-(meth)acrylamido-substituted hydrocarbon radicals are preferably prepared by the method of Varaprath, U.S. Pat. No. 4,608,270. Briefly, this method comprises admixing, in the presence of an aqueous solution of a water-soluble alkaline material and a water-insoluble solvent and at as low a temperature as possible, a (meth)acrylyl chloride to an aminosilicon compound having at least one silicon-bonded amino-substituted hydrocarbon radical containing at least one nitrogen-bonded hydrogen.

The silicon-bonded amino-substituted hydrocarbon radical has the formula $-Q(NHQ')_aNHZ$ wherein Q, Q' and Z have the general and preferred meanings denoted above and a has a value of 0 or 1. Examples of amino-substituted hydrocarbon radicals include, but are not limited to, $NH_2CH_2CH_2CH_2-$, $NH_2CH_2CH(CH_3)CH_2-$, $CH_3NHCH_2CH_2CH_2-$, $NH_2CH_2CH_2NHCH_2CH_2CH_2-$, $NH_2CH_2CH_2NHCH_2CH(CH_3)CH_2-$, $NH_2(CH_2)_6NH(CH_2)_3-$ and $NH_2(CH_2)_6NHCH_2CH(CH_3)CH_2-$.

Aminosilicon compounds are well known in the organosilicon art and need no detailed description herein as to their preparation. Some are commercially available. The disclosures of U.S. Pat. Nos. 2,557,803; 2,738.357; 2,754,312; 2,762,823; 2,998,406; 3,045,036; 3,087,909: 3,355,424; 3,560,543; 3,890,269: 4,036,868; 4,152,346 and 4,507,455 are incorporated herein by reference to further teach how to prepare aminosilicon compounds that can be used to prepare (meth)acrylamidoorganosilicon compounds.

The alkaline material, (meth)acrylyl chloride and aminosilicon compound are preferably used in equivalent amounts; e.g. one molecule of sodium hydroxide for every molecule of (meth)acrylyl chloride for every molecule of aminosilicon compound which bears an acylatable amino group.

The amount of solvent that is used in the method of this invention should be sufficient to dissolve the aminosilicon compound and, preferably, the organosilicon product as well.

The vinyl monomer compound (ii) of the compositions of this invention is selected from the group consisting of vinyl-substituted, free radical-polymerizable organic compounds.

Examples of vinyl monomers suitable for use in the compositions of this invention include, but are not limited to, monoacrylates such as tetrahydrofurfuryl acrylate di-cyclopentyl acrylate, glycidyl acrylate, phenoxyethyl acrylate, N,N-dimethylaminoethyl acrylate, cyclohexyl acrylate, 2-ethylhexyl acrylate, isobornyl acrylate and 2-ethylhexyl acrylate; multi-acrylates such as 1,4-butanediol diacrylate, tripropylene glycol diacrylate, neopentylglycol diacrylate, trimethylolpropane triacrylate, 1,6-hexanediol diacrylate pentaerythritol acrylate and ethoxylated bis-phenol-A diacrylate; and unsaturated amides such as N-vinyl pyrrolidone and isobutoxymethyl acrylamide.

In a preferred embodiment of this invention the vinyl monomer is 1,6-hexanediol diacrylate since adhesive-releasing compositions of this invention containing this vinyl monomer are more readily wetted with adhesives, during application and after curing of the adhesive, than compositions of this invention containing other vinyl monomers.

In another preferred embodiment the vinyl monomer compound is N-vinyl pyrrolidone since this compound has a more favorable viscosity-lowering effect than other vinyl monomers.

However, in certain instances, such as when the toxicity of the vinyl monomer compound becomes a factor, compositions of this invention containing other vinyl monomer compounds may be more preferred.

The amounts of the (meth)acrylamidoorganosilicon (i) and the vinyl monomer compound (ii) that are used in the compositions of this invention are such as to provide from 0.1 to 60, preferably from 1 to 30 and most preferably from 5 to 15 percent by weight, based on the weight of (i) plus (ii), of the vinyl monomer compound.

The curable compositions of this invention comprising components (i) and (ii) can further comprise a polymerization-initiating amount of a polymerization initiating compound, such as a free radical generator or a photoinitiator to facilitate the curing thereof when the composition is to be cured by thermal and/or ultraviolet radiation. The particular initiator to be included depends upon the method to be used for curing the composition.

When the composition is to be cured by thermal means it is preferred that a free radical initiator be added to the curable composition. Examples of suitable free radical initiators include, but are not limited to, redox pairs, perborates, percarbonates photochemical systems, azo compounds such as azo-bis(isobutyronitrile), acyl peroxides such as benzoyl peroxide, alkyl peroxides such as di-t-butyl peroxide and hydroperoxides such as cumene hydroperoxide.

When the composition is to be cured by ultraviolet radiation it is preferred that a photoinitiator be added to the composition. Examples of suitable photoinitiators include, but are not limited to, benzoin, benzoin alkyl ethers such as methyl, ethyl, isopropyl or isobutyl benzoin ether, acetophenone derivatives such as dialkoxyacetophenone such as diethoxyacetophenone, di- and trichloroacetophenones. α, α-dimethoxy-α-phenylacetophenone, 1-hydroxycyclohexylphenyl ketone, 2-hydroxy-2-methyl-1-phenylpropane-1-one, methylphenyl glyoxylate, 4-benzoylbenzyl-trimethylammonium chloride, α-acyloxime esters such as 1-phenyl-1,2-propanedione-2-(O-ethoxycarbonyloxime), thioxanthane and its derivatives, benzophenone in combination with a chain transfer agent such as a NH group and azo-bis(isobutyronitrile).

The amount of the polymerization initiating compound (iii) that is to be used in the compositions of this invention is merely that amount that will initiate the cure of the composition when it is exposed to elevated temperatures or photoactive UV. Said amount can be easily determined for any particular composition by routine experimentation, such as by using an amount of about 5 percent by weight, based on the weight of the (meth)acrylamidoorganosilicon compound and the vinyl monomer, of the polymerization initiating compound and including amounts incrementally greater and lesser than 5 percent in other compositions and exposing the compositions to the appropriate polymerizing conditions, such as a temperature sufficiently high to activate the free radical generator or photoactive UV to activate the photoinitiator.

Photoactive UV, and sources thereof, are well known in the radiation-curable silicone composition art and need no detailed explanation herein. The reader is referred to any of the standard references that teach the polymerization of acrylyl-containing monomers. Included herein by reference are *Kirk-Othmer Encyclopedia of Chemistry and Technology;* John Wiley and Sons, N.J., Second Edition, 1972, Vol. I, pp. 274 to 284 and *Encyclopedia of Polymer Science and Technology;* John Wiley and Sons, N.J., 1966, Vol. I, pp. 177 to 197. For the purposes of this invention photoactive UV radiation preferably comprises electromagnetic radiation having a wavelength of from 200 to 400 nm.

When the curable compositions of this invention are to be cured by electron beam radiation the addition of a polymerization initiator compound (iii) is not needed.

The curable compositions of this invention can further comprise optional components which are commonly used in curable silicon-containing compositions. Examples of said optional components include, but are not limited to, solvents such as those used to prepare the acrylylated silicon compound used therein, emulsion-forming components such as water and surfactants, colorants, stabilizers, fillers such as silica and carbon, adhesion promoters and surface modifiers such as lubricants and release agents.

The curable coating compositions of this invention thus have many of the utilities of curable compositions such as compositions for molding, encapsulating, sealing and coating. In particular they find utility for coating flexible substrates such as paper, metal foil, polymer films, optical fibers and textiles and relatively non-flexible substrates such as polymer laminates, such as circuit boards, siliceous substrates such as ceramic, glass and brick, wood substrates and molded, cast and stamped metal articles. The curable coatings of this invention are useful in the adhesive release art, the electronic art such as encapsulating and photoresist, the graphic art etc.

Thus, in a second aspect the present invention relates to a process for providing a cured silicon-containing coating on a substrate, said process comprising (A) applying the curable composition of this invention to the substrate and thereafter (B) curing the applied coating.

In the process of this invention the curable coating composition of this invention is applied to a substrate as a thin layer by any suitable manner such as brushing, spraying, rolling, dipping or spreading. By a thin layer it is meant a layer ranging from monomolecular to a hundred mils in its smallest dimension. Curable coating compositions of this invention are typically applied in a layer having a thickness of from 0.01 to 100 mils.

The applied coating can be cured by any suitable means such as chemical, radiant or thermal means. By cure it is meant conversion of the coated composition from the liquid to the non-liquid state, preferably to the nil migration, nil rub-off, nil smear condition, described below.

When the applied coating is to be cured by thermal or ultraviolet radiation the applied composition should contain a polymerization initiator compound (iii), as noted above. In a preferred embodiment of this invention the applied composition is cured with electron beam radiation and the composition needs no added initiator.

As noted above, the coating composition of this invention can be applied to substrates of various compositions, shapes, sizes and uses. In a preferred embodiment of this process a flexible substrate is coated for the purpose of providing for the substrate an adhesive-releasing surface.

In the adhesive-releasing art a flexible substrate such as paper, polymer film, polymer-coated paper or metal foil is rendered adhesive-releasing by the application of a curable fluid composition to the flexible substrate at a coating weight of from 0.5 to 2 pounds per ream of substrate. After the applied composition has been cured the thus-treated surface is brought into adhesive contact with an adhesive, either free or disposed on a surface of an article. The adhesive-releasing surface thereby serves as a protective layer for one surface of the adhesive until the adhesive is to be used, whereupon it can be readily removed from the adhesive.

In the process and compositions of this invention there is provided a fast, clean efficient process for providing an adhesive-releasing surface for cast adhesives or supported adhesives and in an on-line, i.e. immediate adhesive coating, mode or in a conversion, i.e. delayed adhesive coating, mode. Advantageously, the compositions of this invention have the viscosity of solvent-based coating compositions without the main disadvantage thereof, i.e. the need to remove and recover a solvent.

The following examples are disclosed to further teach how to practice, but not to limit, the invention which is properly delineated by the appended claims.

All parts, percentages and ratios are by weight unless otherwise stated.

The state of cure of an adhesive-release coating was determined by the rub-off, migration and smear tests.

Smear of a coating was measured by lightly rubbing the coating with a finger and looking for hazing of the coating. The degree of haze (nil, very slight, slight, moderate, gross) that was observed indicated the degree of smear of the coating. A fully cured coating shows no haze and therefore has nil smear.

Rub-off of a coating was measured by vigorously rubbing the coating with the index finger tip, trying to remove the coating from the paper. The extent of rub-off was described as nil, very slight, slight, moderate or gross. A fully cured coating demonstrates nil rub-off.

Migration of a coating was measured by placing a test strip of No. 5910 3M (St. Paul, Minnesota) brand transparent tape on the coating, adhesive-bearing surface in contact with the coating, and rubbing the strip 5 to 20 times with a finger to adhere it to the coating. The strip of transparent tape was then removed from the coating and its adhesive-bearing surface was doubled, end to end onto itself and pressed firmly together. For a coating having nil migration the force needed to separate the doubled test strip was approximately the same as the force needed to separate a doubled strip of unexposed tape. Other ratings include very slight, slight, moderate and gross migration. A fully cured coating demonstrates nil migration.

Adhesive release for a coating was measured on a fully cured coating. Each cured coating was prepared for release testing according to the following procedure. The cured coating was coated with adhesive using either a solution of Monsanto (St. Louis, Mo.) GMS-263 acrylic adhesive (hereinafter acrylic adhesive) or National Starch (New York, N.Y.) 36-6045 styrenebutadiene rubber adhesive (hereinafter SBR adhesive). The adhesive solution was applied to the cured coating at a wet thickness of 3 mils (76.2 mm) using a draw down bar. The applied adhesive was air-dried at room temperature for one minute, heated at 70° C. for one minute and then cooled to room temperature again for 1 minute. A sheet of 60 pound matte litho was applied to the dried adhesive and the resulting laminate was pressed with a 4.5 pound rubber coated roller.

Release testing of the laminates was accomplished by cutting the laminates into 1 inch (25.4 mm) strips and pulling the matte/adhesive laminate from the kraft paper/coating laminate at an angle of 180° at 400 inches/minute (0.17 m/s). The force, in grams per inch, that was required to separate the laminates was noted as adhesive release.

EXAMPLES 1-7

An acrylamidoorganosiloxane having the formula $Me_3SiO(Me_2SiO)_{69.25}(MeYSiO)_{3.75}SiMe_3$, wherein Y denotes an acrylamido-substituted hydrocarbon radical having the formula $-CH_2CH(CH_3)CH_2NACH_2CH_2NHA$ and A denotes the acrylyl radical, was prepared by the method of Varaprath, U.S. Pat. No. 4,608,270.

Seven compositions of this invention were prepared by mixing the acrylamidoorganosiloxane with the amount and type of vinyl monomer noted in Table I. A control composition containing no vinyl monomer was also included in this study. These examples and control illustrate the significant reduction in viscosity of the acrylamidoorganosiloxane that occurs when as little as 2 to 5% of a vinyl monomer is mixed therewith.

The mixtures containing 5% vinyl monomer were coated onto polyethylene-coated kraft paper using a doctor blade set at a pressure of 17 psi, and the coatings were irradiated with electron beam radiation (Energy Sciences Lab Model Electrocurtain CB 150/15/10L). Curing to no smear, no migration and no rub-off was achieved at 3 Mrad dosage under a nitrogen atmosphere containing from 280 to 460 ppm oxygen. The accelerating voltage was kept between 150 and 160 kilovolts.

The thus-coated papers were next laminated with acrylic adhesive, following the procedure noted above and the adhesive release force of the laminates were measured after 1 day, 1 week and 1 month of room temperature aging. Results are summarized in Table I.

TABLE I

| Example | Vinyl Monomer Identity* | % | Viscosity cP. | % Red. | Release, g/in. 1-day | 1-wk. | 1-mo. |
|---|---|---|---|---|---|---|---|
| Control | None | 0 | 2594 | — | 33 | 27 | 34 |
| 1 | BDDA | 2 | 1785 | 31.2 | — | — | — |
| 2 | BDDA | 5 | 1123 | 56.7 | 33 | 53 | 38 |
| ** | | | | | 25 | 21 | 25 |

TABLE I-continued

| Example | Vinyl Monomer Identity* | % | Viscosity cP. | % Red. | Release, g/in. 1-day | 1-wk. | 1-mo. |
|---------|------------------------|---|---------------|--------|----------------------|-------|-------|
| 3 | NVP | 2 | 1447 | 44.2 | — | — | — |
| 4 | NVP | 5 | 859 | 66.9 | 42 | 59 | 29 |
| ** | | | | | 47 | 16 | 28 |
| 5 | P | 5 | 2041 | 21.3 | 75 | 57 | 113 |
| ** | | | | | 39 | 16 | 19 |
| 6 | C | 5 | 1441 | 44.4 | 32 | 34 | 44 |
| ** | | | | | 41 | 33 | 27 |
| 7 | TPGDA | 5 | 1418 | 45.3 | 101 | 92 | 101 |
| ** | | | | | 42 | 30 | 29 |

*BDDA is 1,4-butanediol diacrylate. NVP is N—vinyl pyrrolidone. TPGDA is tripropylene glycol diacrylate. P is Photomer 4171, Diamond Shamrock Chemicals Co.; Morristown, NJ. C is CHEMPOL 19-6005, Radcure Specialties, Inc.; Port Washington, WI.
**Repeat laminating and release testing 1 day later with new samples of coated paper.

EXAMPLES 8 to 16

The acrylamidoorganosiloxane described in the above examples was used to prepare nine compositions of this invention having 5% of one of the following vinyl monomers: neopentylglycol diacrylate, tetrahydrofurfuryl acrylate, dicyclopentyl acrylate, glycidyl acrylate, N,N-dimethylaminoethyl acrylate, cyclohexyl, acrylate, 2-ethylhexyl acrylate, isobornyl acrylate and phenoxyethyl acrylate.

The compositions were coated onto polyethylene-coated kraft paper, cured with electron beam radiation, laminated with acrylic adhesive and tested for adhesive release as described in the above examples.

All compositions except the composition containing N,N-dimethylaminoethyl acrylate were fully cured with 2 megarads of radiation. The exception composition required 3 megarads.

All compositions were easily wetted by the acrylic adhesive during the lamination process and released the acrylic adhesive with a force of less than 100 grams per inch.

EXAMPLES 17 TO 38

The acrylamidoorganosiloxane described in the above examples was used to prepare 22 compositions of this invention having either 10 or 20% of one of the following vinyl monomers: tetrahydrofurfuryl acrylate, dicyclopentyl acrylate, glycidyl acrylate, N,N-dimethylaminoethyl acrylate, cyclohexyl acrylate, 2-ethylhexyl acrylate, isobornyl acrylate, 1,4-butanediol diacrylate, tripropyleneglycol diacrylate N-vinyl pyrrolidone and phenoxyethyl acrylate.

The compositions were coated onto polyethylene-coated kraft paper, cured with electron beam radiation, laminated with acrylic adhesive and tested for adhesive release as described in the examples above.

All compositions, except those containing glycidyl acrylate, phenoxyethyl acrylate and tripropyleneglycol diacrylate were compatible. The exception compositions were cloudy.

All compositions, except the composition containing N-vinyl pyrrolidone, glycidyl acrylate, cyclohexyl acrylate at 20% and phenoxyethyl acrylate at 20%, were fully cured with 2 megarads of radiation. The exception compositions required 3 megarads.

All compositions, except those containing 20% of phenoxyethyl acrylate, tripropyleneglycol diacrylate or 1,4-butanediol diacrylate, coated the polyethylene-coated kraft paper satisfactorily.

All compositions, except those containing isobornyl acrylate at the 20% level and tripropyleneglycol diacrylate, released the acrylic adhesive with a force of less than 100 grams per inch.

EXAMPLES 39 AND 40

An acrylamidoorganosiloxane having the formula $Me_3SiO(Me_2SiO)_{95.94}SiMe_3$, wherein Y denotes an acrylamido-substituted hydrocarbon radical having the formula $-CH_2CH(CH_3)CH_2NACH_2CH_2NHA$ and A denotes the acrylyl radical, was prepared as noted in the examples above.

This acrylamidoorganosiloxane was mixed with a 50/50 mixture of benzophenone and 1-hydroxycyclohexylphenyl ketone as a photosensitizer and trimethylolpropane triacrylate to provide Examples 39 and 40 of this invention. A control composition containing no vinyl monomer was also prepared.

The three compositions were coated onto several sheets of supercalendered kraft paper and polyethylene-coated kraft paper and exposed to the ultraviolet light from 2 medium pressure mercury vapor lamps having output of 200 watts/inch at a distance of 2 to 3 inches and at a web speed of 30 feet per minute. All coatings were fully cured. (Except Example 40 on supercalendered kraft paper which showed slight smear and migration but no rub-off and required a slower web speed to be fully cured.)

The cured coatings were laminated with SBR and acrylic adhesives and the laminates, except Example 40 on supercalendered kraft coated with SBR which coated poorly with the adhesive, were tested for adhesive release after 60 hours aging at room temperature. Results are summarized in Table II.

TABLE II

| | Examples | | |
|---|---|---|---|
| Item | 39 | 40 | Control |
| Acrylamidesiloxane, g. | 36 | 32 | 40 |
| Trimethylolpropane triacrylate, g. | 4 | 8 | 0 |
| Photosensitizer, g. | 2 | 2 | 2 |
| Acrylic Release, g./in. | | | |
| Supercalendered | 80 | 95 | 125 |
| Polyethylene-Coated | 100 | 100 | 80 |
| SBR Release, g./in. | | | |
| Supercalendered | 75 | — | 70 |
| Polyethylene-Coated | high | high | high |

EXAMPLES 41 to 51

An acrylamidoorganosiloxane having the formula $Me_3SiO(Me_2SiO)_{45.6}(MeYSiO)_{2.4}SiMe_3$, wherein Y denotes an acrylamido-substituted hydrocarbon radical having the formula $-CH_2CH(CH_3)CH_2NACH_2CH_2NHA$ and A denotes the acrylyl radical, was prepared as noted in the examples above.

Eleven compositions of this invention were prepared by mixing the acrylamidoorganosiloxane with the amount and type of vinyl monomer noted in Table III. A control composition containing no vinyl monomer was also included in this study.

The mixtures and the control were coated onto polyethylene-coated kraft paper and the coatings were irradiated with electron beam radiation (Energy Sciences Lab Model Electrocurtain CB 150/15/10L). Curing to no smear, no migration and no rub-off was achieved at various dosages, as noted in Table III. under an inert atmosphere containing from 240 to 360 ppm oxygen. The accelerating voltage was kept between 150 and 160 kilovolts.

The thus-coated papers were next laminated with SBR and acrylic adhesives, following the procedure noted above, and the adhesive release force of the laminates were measured after 1 day of room temperature aging. Results are summarized in Table III.

TABLE III

| Example | Vinyl Monomer Identity* | % | Dose, Mrads. | Release, g/in. Acrylic | SBR |
|---|---|---|---|---|---|
| Control | None | 0 | 3 | 80 | 75 |
| 41 | TMPTA | 5 | 2 | 52 | 74 |
| 42 | IBMA | 5 | 3 | 109 | 60 |
| 43 | IBMA | 10 | 2 | 221 | 75 |
| 44 | NVP | 5 | 3 | 62 | 64 |
| 45 | NVP | 10 | 3 | 132 | 62 |
| 46 | NVP | 20 | 3 | — | 96 |
| 47 | NVP | 30 | 3 | 189 | 54 |
| 48 | HDDA | 5 | 2 | 69 | 58 |
| 49 | HDDA | 10 | 2 | 74 | 101 |
| 50 | HDDA | 20 | 1.65 | 49 | 64 |
| 51 | HDDA | 40 | 1.65 | 72 | 94 |

*HDDA is 1,6-hexanediol diacrylate. NVP is N—vinyl pyrrolidone. IBMA is Isobutoxymethyl acrylamide. TMPTA is Trimethylolpropane triacrylate.

EXAMPLES 52 AND 53

An acrylamidoorganosiloxane having the formula $Me_3SiO(Me_2SiO)_{45.6}(MeYSiO)_{2.4}SiMe_3$, wherein Y denotes an acrylamino-substituted hydrocarbon radical having the formula $—CH_2CH(CH_3)CH_2NACH_2CH_2NHA$ and A denotes the acrylyl radical, was prepared as noted in the examples above.

Two compositions of this invention were prepared by mixing the acrylamidoorganosiloxane with the amount and type of vinyl monomer noted in Table IV. A control composition containing no vinyl monomer was also included in this study.

The two mixtures and the control were coated onto polyethylene-coated kraft paper and the quality of the coating was observed for each coating.

Next the coatings were irradiated with electron beam radiation (Energy Sciences Lab Model Electrocurtain CB 150/15/10L). Curing to no smear, no migration and no rub-off was achieved at 3 Mrads, under a nitrogen atmosphere containing from 190 to 200 ppm oxygen. The thus-coated papers were next laminated with SBR and acrylic adhesives, following the procedure noted above, and the wetting of the releasing surface was noted for each release coating before and after the adhesive was dried. Results are summarized in Table IV.

TABLE IV

| Example | Vinyl Monomer* | Viscosity cP. | % Red. | Wetting*** With Acrylic** | SBR** |
|---|---|---|---|---|---|
| Control | None | 1119 | — | OK/VP | SOP/VP |
| 52 | IBMA | 996 | 11.0 | MG/MG | SOP/P |
| 53 | HDDA | 590 | 47.3 | VS/F | SOP/F |

*IBMA is isobutoxymethyl acrylamide. HDDA is 1,6-hexanediol diacrylate.
**SOP is slight orange peel. P is poor. VP is very poor. MG is moderately good. OK is okay. F is fair. VS is very smooth.
***Before drying/After drying of the applied adhesive.

That which is claimed is:

1. A curable composition comprising
   (i) a (meth)acrylamidoorganosilicon compound containing at least one silicon-bonded, (meth)acrylamido-substituted hydrocarbon radical having the formula $—Q(NAQ')_aNAZ$ wherein a has a value of 0 or 1, Z denotes H or R, R denotes a monovalent hydrocarbon radical, Q and Q' denote divalent hydrocarbon radicals and A denotes a (meth)acrylyl radical having the formula $—C(O)CB=CH_2$ wherein B denotes hydrogen or methyl; any remaining silicon-bonded radicals in said (meth)acrylamidoorganosilicon compound being selected from the group consisting of organic radicals, divalent oxygen atoms linking silicon atoms, hydrogen atoms and hydroxyl radicals,
   (ii) from 0.1 to 60 percent by weight, based on the weight of (i) plus (ii), of a vinyl monomer compound and, optionally,
   (iii) a polymerization-initiating amount of a polymerization initiator compound.

2. A curable composition according to claim 1 wherein the (meth)acrylamidoorganosilicon compound is a siloxane.

3. A curable composition according to claim 1 wherein the (meth)acrylamidoorganosilicon compound has the formula $YR_2SiO(R_2SiO)_x(YRSiO)_ySiR_2Y$ wherein R contains from 1 to 6 carbon atoms, Y denotes R or $—Q(NAQ')_aNAZ$, x has a value of from 0 to 5000 and y has a value of from 0 to 500; there being at least two (meth)acrylamido-substituted hydrocarbon radicals per molecule of (meth)acrylamidoorganosilicon compound.

4. A curable composition according to claim 3 wherein each (meth)acrylamido-substituted hydrocarbon radical has the formula $—QNACH_2CH_2NAH$.

5. A curable composition according to claim 4 wherein each R denotes the methyl radical.

6. A curable composition according to claim 5 wherein the (meth)acrylamidoorganosilicon compound has the formula

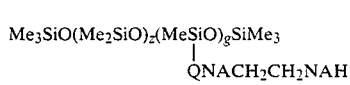

wherein, independently at each occurrence, Me denotes a methyl radical, z has a value of from 10 to 2000 and g has a value of from greater than zero to 0.1z.

7. A curable composition according to claim 6 wherein the (meth)acrylamidoorganosilicon compound has the formula

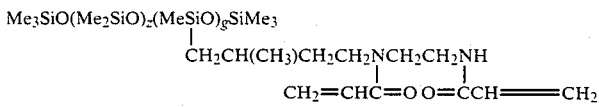

wherein, independently at each occurrence, z has a value of from 50 to 500 and g has a value of from 3 to 10.

8. A curable composition according to claim 7 further comprising a polymerization-initiating amount of a polymerization initiator.

9. A curable composition according to claim 7 wherein the vinyl monomer compound is 1,6-hexanediol diacrylate.

10. A curable composition according to claim 7 wherein the vinyl monomer compound is N-vinyl pyrrolidone.

11. A process for providing a cured silicon-containing coating on a substrate, said process comprising (A) applying the curable composition of claim 1 to the substrate and thereafter (B) curing the applied coating.

12. A process for providing a cured adhesive-releasing coating on a substrate, said process comprising (A) applying the curable composition of claim 7 to the substrate and thereafter (B) curing the applied coating.

13. A process according to claim 12 wherein the substrate is a flexible sheet material.

14. A process for providing a cured adhesive-releasing coating on a substrate, said process comprising (A) applying the curable composition of claim 8 to the substrate and thereafter (B) curing the applied coating.

15. A process according to claim 14 wherein the substrate is a flexible sheet material.

16. A process for providing a cured adhesive-releasing coating on a substrate, said process comprising (A) applying the curable composition of claim 9 to the substrate and thereafter (B) curing the applied coating.

17. A process according to claim 16 wherein the substrate is a flexible sheet material.

18. A process for providing a cured adhesive-releasing coating on a substrate, said process comprising (A) applying the curable composition of claim 10 to the substrate and thereafter (B) curing the applied coating.

19. A process according to claim 18 wherein the substrate is a flexible sheet material.

* * * * *